Patented July 23, 1929.

1,721,675

UNITED STATES PATENT OFFICE.

FREDERICK C. STANLEY, OF FAIRFIELD, CONNECTICUT, ASSIGNOR TO THE RAYBESTOS COMPANY, OF BRIDGEPORT, CONNECTICUT, A CORPORATION OF CONNECTICUT.

BRAKE LINING AND METHOD OF MAKING SAME.

No Drawing. Application filed October 19, 1926. Serial No. 142,785.

This invention relates to brake lining as generally applied to automobile brakes, and to the process of making the same, and has as a particular object the production of a lining which will not freeze to the brake drum when wet and which retains its high coefficient of friction for braking purposes.

This invention is a further development of the invention disclosed in my prior application, Serial No. 132,655, filed August 30, 1926, and according to which the brake lining was treated with glycerin.

At the present time considerable trouble is experienced and also considerable damage is done by the accumulation of moisture in the brake or between the brake band and the brake drum and later freezing in cold weather when the car is left standing with the brakes applied, so that the brake band or lining freezes to the metal drum. It is then, of course, impossible to start the car without first releasing the band from the drum, or, if an attempt is made to start the car, the rear axle or other mechanism may be broken. I have found that by treating the brake band with a solution containing sufficient glycerin that it will be retained in such a quantity by the band as to leave by its contact an enduring film of glycerin on the surface of the brake drum, it will diminish the force of adhesion between the ice and the drum and the band will not freeze to the drum. Glycerin will mix with water in almost any proportion and the mixtures of glycerin and water have a lower freezing temperature than 32° F. or the normal freezing temperature of water, and the greater the proportion of glycerin in the mixture the lower will be the freezing point. This thin film of glycerin adjacent the surface of the drum mixes with the moisture should any enter the brake, and forms a film next to the surface of the drum which has a very low freezing point, and therefore, the band cannot freeze to the drum in temperatures which are ordinarily encountered in most climates.

I have found, however, that with the use of free glycerin it is dissolved by water entering the brake and is gradually washed away so that after the brake has been used for some time the amount of glycerin may have been so reduced as not to be so effective as desired in preventing the freezing of the band to the drum. I have discovered, however, that by applying litharge or a similar metallic oxide to the band after treating it with the glycerin, the litharge or similar oxide and glycerin combine to form a waterproof cement which retains the glycerin in the band or lining, but which is decomposed by heat incident to the operation of the brake to free sufficient glycerin to unite with the moisture to form a thin film of the mixture of water and glycerin which freezes at a sufficiently low temperature to prevent freezing of the lining to the drum in the temperatures usually met with in practice. While I have mentioned litharge and other metallic oxides, I do not wish to be limited to their use, but wish to include any substance which forms a lute with glycerin and on hardening becomes insoluble in water.

In practice it is preferred that the fibre brake lining, usually composed of a suitable fibre including asbestos fibre with or without the usual saturant compound, be immersed for from one to five minutes, or a sufficient time, in undiluted glycerin, a mixture of glycerin and water, a mixture of glycerin and alcohol, or a mixture of glycerin, alcohol and water to give sufficient penetration of the glycerin into the lining or allow absorption of the glycerin by the lining. The water or alcohol or both together is used as a diluent for the glycerin and to produce a liquid which will have better penetration than the glycerin alone. The lining is then dusted with litharge or any other metallic oxide, such as manganese oxide, or there is added any other substance which forms a lute with the glycerin and on hardening becomes insoluble in water. It is preferred, however, to use litharge. This litharge is held by adhesion to the glycerin on the band and then combines with it to form a waterproof cement which solidifies. The free glycerin left in the lining should not be in excess of about 20% of the weight of the lining, because an excess of free glycerin would act as a lubricant and reduce the coefficient of friction between the lining and the drum, and thus reduce the braking effect. The amount of the litharge or other oxide used is determined by the amount which will be taken up by the glycerin. The resultant compound formed by the glycerin and the litharge is a solid which is insoluble in water.

In applying the glycerin to the brake band or lining it may be applied to the untreated tape or sheet from which the lining is made, but it is preferred that it be applied to the completed lining, and the material is treated a sufficient length of time to cause some penetration of the glycerin into the lining, although it is not necessary that there be a complete impregnation or saturation. If the glycerin is dissolved in water or alcohol, or in a mixture of both, they act as a diluent for the glycerin to assist the penetration thereof into the lining.

At the present time it is preferred that the lining be treated substantially as above indicated and that litharge be used as the metallic oxide. Other metallic oxides, however, may be used, such for example, as manganese oxide or any other metallic oxide which with glycerin will form a waterproof cement. I prefer, however, to use litharge as it is cheaper and gives satisfactory results, and I have, therefore, stressed its use throughout the specification, but I do not, however, use this in a limiting sense as I wish to cover the use of any material which will have substantially the same effect.

It is further not necessary that the oxide and the glycerin be applied separately to the lining because a paste may be made of the glycerin and lithrage, or other similar oxide, and applied to the lining. It will be necessary, however, in making this paste to have an excess of the glycerin in order to keep it in the form of a paste, as otherwise the litharge and glycerin would soon combine and set to form the solid cement.

The advantages of a brake band or lining treated in this manner are that the free glycerin will mix with water to form a thin film which freezes only at a very low temperature or considerably below the normal freezing point of water, depending upon the percentage of glycerin in the mixture. The litharge combines with the glycerin and forms a solid which is insoluble in water, that is, in effect the litharge renders the glycerin insoluble in water so that it is not dissolved by water entering the brake and washed away. However, every time the brake is heated a certain amount incident to its use some of this solid compound is broken up freeing sufficient glycerin to combine with the water to prevent freezing of the lining to the drum. Also the litharge glycerin compound fills the interstices made in weaving the lining, and makes the lining less permeable to water, and therefore, with the use of these substances less water is retained in the brake than is the case where ordinary linings are used, and for this reason there is less water in the brake to freeze and cause trouble in cold weather. The lining is, therefore, so nearly waterproof there is very little penetration of the lining by the water and for this reason there is less cohesion between its surface and that of any ice film which might be formed. In linings treated in this manner there is probably an excess of uncombined glycerin within the lining, while on the external portion of the lining there is an excess of uncombined litharge, and the compound formed by the glycerin and litharge is insoluble in water and will tend to retain the glycerin in the lining. In the use of the lining some of the excess of the glycerin will come to the surface and combine with the excess of litharge there. Then the heating of the lining will decompose some of the compound, liberating some free glycerin which dissolves in the water forming a liquid which will prevent freezing as above described.

Having thus set forth the nature of my invention, what I claim is:

1. A brake lining comprising an impregnated fibre body treated with glycerin and to which litharge has been applied.

2. A brake lining comprising an element including asbestos fibre and coated with a compound formed by the reaction of glycerin with litharge.

3. A brake lining comprising a fibre element coated with a waterproof cement formed by the reaction of glycerin with a metallic oxide.

4. A brake lining having the property of resisting freezing to a drum the surface of which lining is coated with glycerin and another substance which forms a lute with glycerin and on hardening becomes insoluble in water.

5. A brake lining comprising a fibre element made impervious to water by the application of a lute containing glycerin.

6. A brake lining comprising a fibre element including asbestos made impervious to water by the application of a lute containing glycerin and litharge.

7. The process of making brake linings which consists in providing an element composed of a suitable fibre impregnated with a liquid containing glycerin, and then applying to the element a metallic oxide which will form with the glycerin a waterproof cement.

8. The process of making brake linings which consists in providing an element composed of a suitable fibre including asbestos, immersing the element in a liquid containing glycerin for a sufficient time to allow some penetration of the lining by the liquid, and then applying litharge to the element.

9. The process of making brake lining which consists in providing an element of a suitable fibre and applying to the element glycerin and a metallic oxide which forms with gylcerin a waterproof element.

10. The process of making brake lining which consists in providing an element of a suitable fibre and applying to the element glycerin and litharge.

11. The process of making brake lining which consists in providing an element of a suitable fibre and applying to the element glycerin and another substance which forms a lute with glycerin and on hardening becomes insoluble in water.

12. The process of making brake linings which consists in providing an element composed of a suitable fibre impregnated with a liquid containing glycerin and then applying litharge to the surface of the lining.

13. The process of preventing freezing of a fibre brake lining to its drum in cold weather which consists in treating the fibre with a liquid containing glycerin a sufficient time to cause some penetration of the fibre by the glycerin, and applying lithrage to the lining.

14. The process of preventing freezing of a fibre brake lining to its drum in cold weather which consists in treating the fibre with a liquid containing glycerin a sufficient time to cause some penetration of the fibre by the glycerin, and then applying to the element a metallic oxide which forms with glycerin a waterproof cement.

In testimony whereof I affix my signature.

FREDERICK C. STANLEY.